P. CASEY.
HORSE-CLIPPING MACHINES.

No. 194,128. Patented Aug. 14, 1877.

WITNESSES:
C. Neveux
J. H. Scarborough

INVENTOR:
P. Casey
BY Munn & Co
ATTORNEYS.

UNITED STATES PATENT OFFICE.

PETER CASEY, OF PROVIDENCE, RHODE ISLAND.

IMPROVEMENT IN HORSE-CLIPPING MACHINES.

Specification forming part of Letters Patent No. 194,128, dated August 14, 1877; application filed June 25, 1877.

*To all whom it may concern:*

Figure 1:
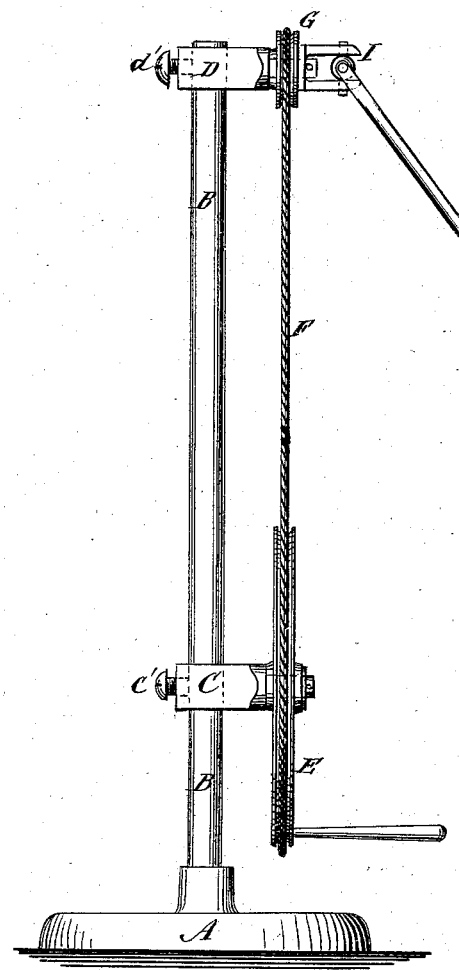
Figure 4:
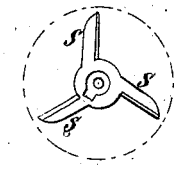
Figure 2:
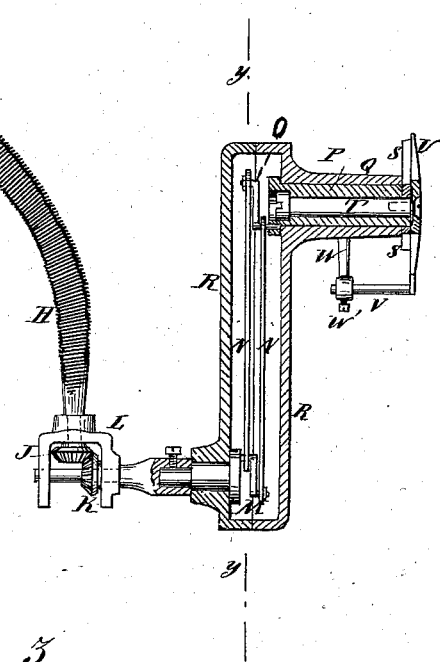
Figure 2:
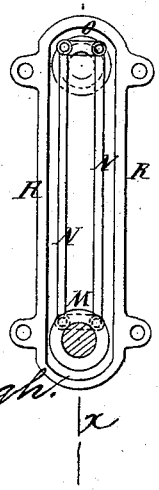
Figure 3:
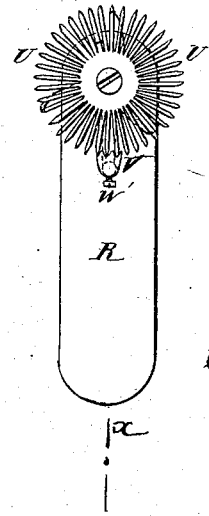

Be it known that I, PETER CASEY, of Providence, in the county of Providence and State of Rhode Island, have invented a new and useful Improvement in Horse-Clipping Machines, of which the following is a specification:

Figure 1 is a side view of my improved machine, partly in section, through the line $x\ x$, Figs. 2 and 3. Fig. 2 is a detail section taken through the line $y\ y$, Fig. 1, showing the double cranks. Fig. 3 is a face view of the operating device. Fig. 4 is a detail view of the knives.

Similar letters of reference indicate corresponding parts.

The object of this invention is to furnish an improved machine for clipping horses, which shall be so constructed as to work without noise, and can thus be used about the head and ears of a horse without frightening him, and which shall be simple in construction, convenient in use, and effective in operation.

The invention will first be described in connection with the drawing, and then pointed out in the claims.

A is the base of the machine, which is made sufficiently large to form a stable support. To the base A is attached the lower end of a post, B. Upon the post B are placed two sleeves, C D, which are secured in place adjustably by set-screws $c'\ d'$.

Upon the lower sleeve C is formed a journal to receive the crank-wheel E, around which passes a belt or band, F, which also passes around a small wheel, G, which revolves upon a journal formed upon the upper sleeve D.

H is a shaft, the upper end of which is connected with the wheel G by a universal ball-joint, I.

The shaft H is made flexible in whole or in part, to enable the cutting device to be worked in any desired position. To the end of the shaft H is attached a small bevel-gear wheel, J, the teeth of which mesh into the teeth of the small bevel-gear wheel K, which are held in gear with each other by the coupling L in which their journals revolve.

The journal of the bevel-gear wheel K is made in the form of a socket, to receive the journal of the double crank M, to which it is secured by a set-screw. To the crank-arms of the double crank M are pivoted the ends of two connecting-bars, N, the other ends of which are pivoted to the crank-arms of the double crank O, attached to the end of a sleeve, P.

The sleeve P revolves within a socket, Q, formed upon the case R, by which the double cranks M O and the two connecting-rods N are inclosed, and which serves as a handle for holding and guiding the cutter.

To the outer end of the sleeve P is attached a hub, provided with three (more or less) radial knives, S. Within the sleeve P is placed a small cylinder, T, having a head formed upon its inner end, which rests in a countersink in the inner end of the sleeve P.

The outer end of the cylinder T projects beyond the outer end of the sleeve P, and to it is attached the hub of the circular comb U, the teeth of which are radial, and which is held stationary by the toothed head of the holder V.

The teeth of the holder V fit upon the outer ends of the teeth of the comb U, and its shank passes through a hole in the end of the short post W formed upon or attached to the socket Q, where it is secured in place by a set-screw, W'.

By this arrangement the comb U raises the hair so that it may be cut by the knives S, and serves as a guard to prevent accidentally cutting the horse.

Should any of the teeth of the comb U become bent or broken, the holder V can be readily detached and the said comb U turned partly around, to bring another part of it into a position to be used.

The edges of the knives S are inclined toward their backs, as shown in Fig. 4, so that they may be ground by turning them backward.

Having thus described my invention, I claim as new and desire to secure by Letters Patent—

1. The combination, with mechanism E F G H I K, of the double crank M, two bars, N N, and double crank O, as and for the purpose described.

2. The combination of sleeve P, socket Q, and case R, as and for the purpose set forth.

3. The circular comb U, having hub attached to cylinder T, in combination with the toothed holder V, as and for the purpose specified.

PETER CASEY.

Witnesses:
 PATRICK COLLINS,
 WILLIAM FLANAGAN.